United States Patent [19]

Gruden

[11] 4,088,099
[45] May 9, 1978

[54] MIXTURE COMPRESSING, EXTERNAL AUTO-IGNITION FOUR-STROKE CYCLE INTERNAL COMBUSTION ENGINE

[75] Inventor: Dusan Gruden, Ditzingen, Germany

[73] Assignee: Porshce AG, Germany

[21] Appl. No.: 715,720

[22] Filed: Aug. 19, 1976

[30] Foreign Application Priority Data

Aug. 19, 1975 Germany .............................. 2536775

[51] Int. Cl.² .................. F02B 19/10; F02B 19/18
[52] U.S. Cl. .................. 123/75 B; 123/32 ST; 123/191 S; 123/191 SP; 123/DIG. 4
[58] Field of Search ........... 123/75 B, 32 ST, 191 SP, 123/191 S, DIG. 4

[56] References Cited
U.S. PATENT DOCUMENTS

| | | | |
|---|---|---|---|
| 3,882,830 | 5/1975 | Kome et al. | 123/32 ST |
| 3,933,134 | 1/1976 | Yagi et al. | 123/191 SP |
| 3,987,765 | 10/1976 | Sato et al. | 123/32 SA |

*Primary Examiner*—Wendell E. Burns
*Attorney, Agent, or Firm*—Craig & Antonelli

[57] ABSTRACT

A mixture compressing external auto-ignited four-stroke cycle internal combustion engine, with charge stratification, has the largest portion of the fuel charge supplied to the main combustion chamber as a lean fuel mixture through at least one inlet valve. The remaining portion of the charge is supplied to an auxiliary combustion chamber as a rich fuel mixture through at least one additional mixture inlet. Also provided is an ignition chamber and an auxiliary combustion chamber connected thereto through at least one opening. The opening is small compared to the size of the ignition chamber in which a sparkplug is arranged. The volume of the ignition chamber is dimensioned in relation to the volume of the auxiliary combustion chamber so that during ignition of the rich fuel mixture a stable flame zone is formed.

13 Claims, 4 Drawing Figures

MIXTURE COMPRESSING, EXTERNAL AUTO-IGNITION FOUR-STROKE CYCLE INTERNAL COMBUSTION ENGINE

FIELD OF THE INVENTION

The present invention relates to a mixture-compressing external auto-ignited, four-stroke cycle internal combustion engine having charge stratification. The largest portion of the charge is delivered through at least one inlet valve to a main combustion chamber as a lean fuel mixture. The remaining portion of the charge is supplied to an auxiliary combustion chamber as a rich fuel mixture through at least one additional mixture inlet. The ignition chamber for the engine is connected to an auxiliary combustion chamber through at least one small opening, with a sparkplug being disposed in the ignition chamber.

BACKGROUND OF THE INVENTION

Recent statutory limitations on the exhaust emissions of internal combustion engines have resulted in an intensive investigation of techniques for limiting exhaust emissions and development of the Otto engine, for the purpose of reducing exhaust emissions to satisfy statutory levels. Moreover, limitations on available fuel reserves have stimulated research to improve fuel ecomomy and to study the feasibility of using alternative types of fuels for internal combustion engines. The combustion portion of the operational cycle of an internal combustion engine is the basic factor upon which economy and exhaust quality depend. Analysis of the combustion process serves to clarify the influence of various parameters with respect to engine efficiency and the creation of undesired exhaust components.

Albeit there are a number of ways to operate an internal combustion engine with a minimal amount of harmful exhaust components, not each of these solutions is a rational and scientific-like approach to the problem, especially when favorable fuel consumption is also a requirement. Of prime consideration is the investigation of those solutions which provide the most complete utilization of the fuel supplied to the engine cylinder, without afterburning the catalytic reactors, and a reduction of harmful exhaust pollutants. This requires an extensive analysis of the combustion process and a maximalization of all factors which influence exhaust emission and fuel consumption.

Of these factors, the one having the largest influence, the air factor $\lambda$, (the ratio of the actual fuel-air mixture to stochiometric fuel-air mixture) on combustion and exhaust emission has been investigated a number of times. For a range of $\lambda = 0.8 - 0.95$ the shortage of oxygen produces incomplete combustion, which results in a relatively high carbon monoxide and high hydrocarbon concentration in the exhaust. The air shortage prevents the formation of large NO quantities even though the maximum combustion temperatures are quite high. An increase in the air-factor lowers the amount of carbon monoxide and hydrocarbon concentrations considerably. Minimal hydrocarbon quantities occur in a range of $\lambda = 1.1 - 1.2$. This is the range of best ecomomy. The high temperatures and sufficient air quantities desirable for oxidation of carbon monoxide and hydrocarbons cause a sharp increase in NO concentration, so that the maximum quantity of nitrogen monoxide takes place within the same air-factor range where the concentration of unburnt hydrocarbons is a minimum. As $\lambda$ exceeds 1.2, the concentration of nitrogen monoxide drops off sharply, so that from a standpoint of the decrease in harmful components in the exhaust, an air-factor range between 1.3 and 1.4 is desired.

Engine operation with lean fuel mixtures has further decided advantages. Leaner mixtures cause an increase in the thermal efficiency as a result of more favorable thermodynamic characteristics of the mixture. A deterioration in the quality and mechanical efficiency with a more lean mixture leads to a decrease in the effective efficiency. An optimum range of operation is obtained when the air-factor lies in a range between 1.2 and 1.4.

In order to reduce the exhaust emissions of the engine to as great a degree as possible and, at the same time, obtain a high engine efficiency, the following considerations must be taken into account.

(1) The operation cycle must terminate at moderate peak pressures and low peak temperatures, so that the quantity of nitrogen monoxide remains as low as possible.

(2) The temperatures during expansion should be relatively high in order to achieve after-oxidation of the non-burned hydrocarbons and carbon monoxide.

(3) In order to assure sufficient oxygen for a complete as possible combustion and after-oxidation of the hydrocarbons and carbon monoxide, the operational cycle must have an air-factor ratio $\lambda = 1.3 - 1.4$.

(4) Differences in successive cycles should be as small as possible. A large non-uniformity of successive cycles reduces the desired and effective efficiency, especially in the air-excess area. Through a decrease in these fluctuations, the composition of exhaust gases from an Otto engine is considerably improved.

The operational cycle having low peak and relatively high expansion temperatures may be realized by delaying the combustion. This is possible by retarding the ignition point or through the use of a considerably lean fuel mixture. Both of these techniques impair indicating data, however. Particularly, the advantages of employing an Otto engine with a lean fuel mixture cannot be utilized since a satisfactory operation of this type of engine is only possible with a small air-factor, lying in a range of to about 1.3. With today's standard engines, there is a trend to employ leaner fuel mixtures with $\lambda > 1$, resulting in a deterioration of the engine operation. By operating the engine with a even leaner mixture both ignition itself and flame-spread deteriorate. The number becomes even larger for those cycles for which the flame, during combustion and expansion, does not act upon the entire charge, so that combustion continues after the exhaust valve is opened. If the fuel mixture is too lean, the presumed combustion portion of an individual cycle does not occur as intended and ignition and combustion discontinue completely, so that stable operation of the engine is no longer possible. One of the results of a poorer combustion process is an increase in the non-uniformity of the combustion cycles, so that the mean pressure falls off and the economy of the engine operation deteriorates. At the same time, there is an increase in the concentration of unburned and partially burned hydrocarbons.

In view of the significance of exhaust emissions and fuel economy on present-day developments in internal combustion engines, extensive research has been conducted for the purpose of extending the operational range of an Otto engine, with respect to the air-excess area. Although there are various techniques to expand the air-factor ratio, for a conventional Otto type engine, improvements in the combustion process in the lean zone, nevertheless, are accompanied by an increase in the combustion temperature and, therewith, the amount of nitrogen monoxide emissions.

One possibility for improving the combustion of a lean fuel mixture is through the use of a so-called stratified charge. The basic premise behind the use of a stratified charge is the preparation of a relatively rich fuel mixture in the area of ignition adjacent to the sparkplug and the use of a very lean fuel mixture in the remaining portion of the combustion chamber which can then be burned quite well. By this technique, the operation of the engine produces a very good air-factor considerably larger than $\lambda = 1.0$. Favorable conditions for ignition and flame propagation will result in an almost complete oxidation of the fuel and very little production of incomplete combustion components, namely carbon monoxide and hydrocarbons. By controlling the ignition and the starting phase of the combustion cycle, with an air-factor of $\lambda = 0.5 - 0.8$ and, for the main combustion, an air-factor of $\lambda = 1.5 - 2.0$, and air-factor of maximum NO formation occurring at about $\lambda = 1.1$ is prevented.

Although there is a large amount of documentation on the application of the stratified charge approach to different types of engines, none finds a better use than the conventional Otto engine, particularly when considering its overall effect, from the standpoint of power output, economy, simple construction and operating reliability.

One possibility of employing charge stratification consists in the direct injection of fuel into the undivided combustion chamber, so that stratification is produced through a directed swirl-movement of the air. By this process, the mixture in the vacinity of the sparkplug is enriched and yet is still ignitable, by the high total air-factor. Of decisive importance in this type of system is injection pressure and the direction in which the fuel is injected, tha positional alignment of the sparkplug and the injection nozzle and, above all, the velocity of the flow of the air. Since the intensity of the air swirl is proportional to the engine speed of rotation, operational difficulties are encountered within a large speed and load range typically required for vehicle engines.

Charge stratification can also be obtained through the use of a divided combustion chamber, and with the aid of an auxiliary combustion chamber. In this case, a lean fuel mixture is drawn into the cylinder, whereas enrichment in the auxiliary combustion chamber is effected by means of an injection nozzle or an additional inlet valve. These arrangements are basically independent of the relative speed and load variations and, accordingly, are well suited for vehicle engines.

For a stratified-charge engine having a divided combustion chamber, it is possible to construct the auxiliary combustion chamber to be relatively small with about 3 to 15% of the compression volume or relatively large with about 20 to 60% of the compression volume. By dividing the combustion chamber into a main and an auxiliary combustion chamber, and by charge stratification, the degree of flamability of the lean fuel mixture is considerably improved. Ignition of the mixture for variable operating conditions, through these means along, however, cannot be guaranteed. The intensive turbulence of the charge in the auxiliary combustion chamber may severely impair the ignition and flamability requirements.

The combustion process in an Otto-type engine consists of the following phases:

Phase 1 — Ignition and formation of a stable flame core (starting phase of the combustion). This phase is often designated as the ignition delay.

Phase 2 — The main phase of combustion, during which the main quantity of fuel burns.

Phase 3 — Afterburning.

The requirements for optimum rundown of the individual phases are variable and contradictory. The duration and performance of the first phase depend upon the ignition conditions, the mixture composition, the intensity of the turbulence, pressure and temperature. Critical conditions for the spark ignition of the fuel with layered combustion are then obtained, when a spherical volume with a radius $R_{Kr}$ is heated to a combustion temperature Tv. The minimum radius $R_{Kr}$ of the flame core, necessary for the ignition of the mixture, is:

$$R_{Kr} \geq 2\sqrt{2} \times \delta_{Fl} \approx 3Fl,$$

wherein small $\delta_{Fl}$ represents the thickness of the flame zone.

After ignition of the mixture within a volume having a critical radius $R_{Kr}$ has occurred, nothing prevents further spread of the flame. For $R < R_{Kr}$, the flame goes out since the heat yield at the unburned portion of the mixture is larger than the heat input through the combustion within the volume R. In the event of an intensively turbulent flow, as is customary with Otto engines, ignition and flamability requirements are considerabily more complicated. The possibility exists that the flame core, subsequent to ignition, first develops undisturbed and then ceases to burn. The critical ignition requirements can be satisfied initially and then disturbed, so that the flame develops slower than would be the case with layered flow.

For the ignition and development of a stable flame core, it is, accordingly, necessary that the heat which is freed by chemical reaction become larger at the small mixture portion, engaged by the spark, than the heat carried away from its surface. Ignition is to take place in the quiet center without the presence of a turbulent flow. High flow velocities also lead to a decrease in ionization and require and increase in the minimum ignition energy.

Combustion in the second phase differs from combustion in the first phase. After the formation of the stable flame core necessary for further runoff of the combustion reaction, an intensive turbulence is necessary for a quick and complete combustion. In conventional Otto engines, and in known stratified charge engines, separation of the individual phases of the combustion process and creation of optimum conditions are necessary for each phase.

An optimization for each individual combustion phase was sought through various stratified engines of the type described above having a main combustion chamber, an auxiliary combustion chamber and an ignition chamber. Mixture compressing external auto-ignited internal combustion engines of this kind, having charge stratification, are described in German Laid Open Publication Number 2448405, wherein the volume of the auxiliary combustion chamber and the volume of a third combustion chamber, referred to as a rest-gas chamber, satisfy the relationship:

$$0.25 \leq \frac{V_z}{V_N + V_z} \leq 0.60,$$

where $V_z$ = the volume of the rest-gas chamber and $V_N$ = the volume of the auxiliary combustion chamber. It has been demonstrated, on the basis of a relatively large volume of the ignition chamber in relation to the volume of the auxiliary combustion chamber, that a considerable burnt rest-gas quantity remains, with a load change which strongly impairs the ignition capability of the subsequent charge in the ignition chamber. Also, charge turbulence is present which disadvantageously affects the ignition of the charge in the ignition chamber.

SUMMARY OF THE INVENTION

It is an object of the present invention to provide a mixture-compressing, external auto-ignited four-stroke cycle internal combustion engine having charge stratification in which the individual combustion phases are optimized. To this end, the volume of the ignition chamber is dimensioned in relation to the volume of the auxiliary combustion chamber in such a manner that, during ignition of the rich fuel mixture, a stable flame is formed. The volume of the ignition chamber advantageously is related to the volume of the auxiliary combustion chamber according to the following relationship:

$$0.01\ V_N \leq V_z \leq 0.1 V_N,$$

wherein $V_z$ = the volume of the ignition chamber, and $V_N$ = the volume of the auxiliary combustion chamber.

Furthermore, it has also been found to be effective to have the fuel quantity/working cycle of the auxiliary combustion chamber satisfy the following relationship with respect to the volume of the auxiliary combustion chamber:

$$0.1 V_N \leq M_K \leq 0.3 V_N,$$

where $M_K$ = the quantity of fuel (mm³) of the auxiliary combustion chamber/working cycle, and $V_N$ = the volume of the auxiliary combustion chamber (cm³). Through a combination of these characteristics, the ignition angle $\alpha$ lies in a range of from 5 to 10 crankshaft rotating degrees, which is considerably smaller than for the conventional Otto engine. The ignition chamber and the auxiliary combustion chamber are connected to each other by at least two openings, reduced in size with respect to the size of the ignition chamber and are arranged at the outer circumference of the ignition chamber so as to be opposite to one another. It has been found advantageous that one of the openings be arranged at the portion of the circumference of the ignition chamber which lies closest to the mixture inlet and that the openings be disposed at an angle with respect to each other, which angle opens towards the auxiliary combustion chamber.

The advantages obtained in accordance with the present invention include a quieter and less turbulent flow in the ignition chamber than in the auxiliary combustion chamber. By supplying the auxiliary combustion chamber with the fuel mixture by way of a supplementary valve, the ignition chamber is scavenged of rest gas during the intake or suction stroke, which is advantageous for the ignition of the mixture. Since the ignition is at a closed, compact space, heat losses are minimized during formation of the flame core. As a result, optimum conditions are created for the ignition and initiation of flash-firing. After a stable flame core has been formed in the ignition chamber, the flame spreads under favorable conditions into the auxiliary combustion chamber. A rich fuel mixture at high temperature results in a fast proceeding combustion after an extremely short ignition delay. The combustion products of the small quantity of the enriched mixture are pushed into the main combustion chamber through a slot-like canal where they ignite very lean fuel mixtures.

DETAILED DESCRIPTION

Figure 1:
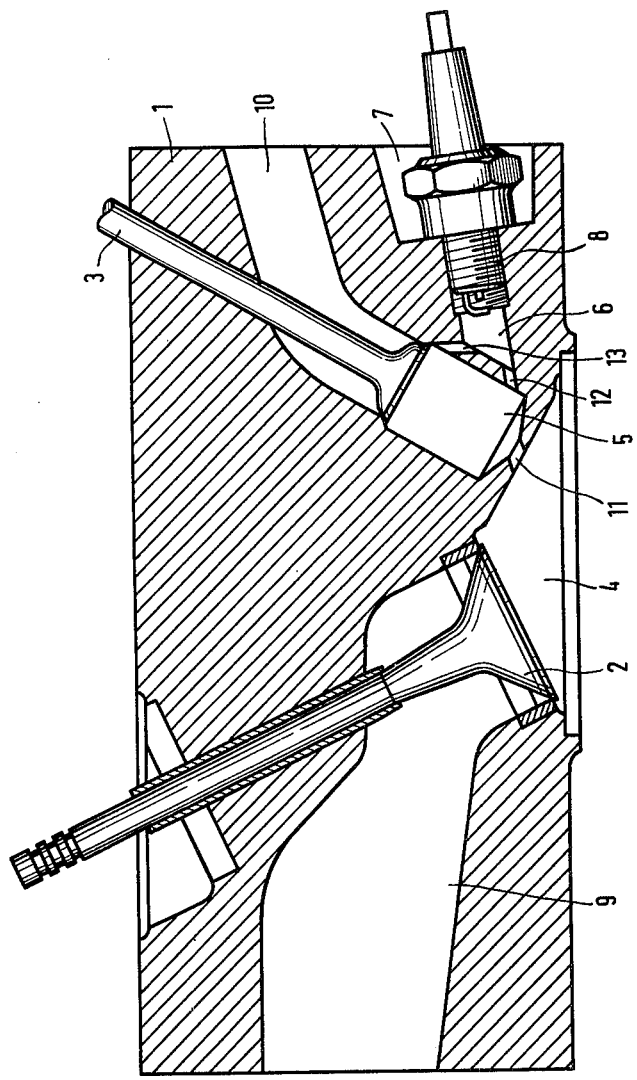
FIG. 1 illustrates a cylinder head of a mixture-compressing, external auto-ignited four-stroke cycle internal combustion engine having charge stratification, showing the ignition chamber and the auxiliary combustion chamber in cross-section.

Referring now to FIG. 1, there is shown, in cross-section, a cylinder head 1 provided with an air inlet valve 2 and a fuel mixture inlet valve 3. The engine also has an exhaust valve (not shown). In place of the mixture inlet valve 3 and injection valve of known construction may be provided. The operation of the valves themselves is accomplished in a known manner and will not be discussed for purposes of insuring a concise description of the invention.

The cylinder head 1 is also provided with a main combustion chamber 4 defined by the inlet valve 2, the exhaust valve (not shown), and the piston (not shown). An auxiliary combustion chamber 5 is connected with the main combustion chamber 4 by way of a slot 11, one end of the auxiliary combustion chamber being defined by the mixture inlet valve 3. An ignition chamber 6 which opens into the auxiliary combustion chamber 5 by means of a bore 12 terminates on the side away from the auxiliary combustion chamber 5 at a sparkplug 8 which is screwed into the cylinder head 1. The inlet valve 2 controls the mixture suction canal 5 and the mixture inlet valve 3 controls the mixture suction canal 10. The ignition chamber 6 is connected by means of a further slot-like opening 13 with the auxiliary combustion chamber 5. Openings 12 and 13 form an angle with one another which opens towards the auxiliary combustion chamber, as shown. These openings 12 and 13 are also diametrically disposed on the circumference of the ignition chamber 6 so that the opening 13 is arranged in the immediate vicinity of the mixture inlet valve 3. The volume of the ignition chamber 6 is, in relation to the volume of the auxiliary combustion chamber 5, dimensioned so that, during ignition of the rich fuel mixture a stable flame zone is formed, so that the volume of the ignition chamber in relation to the volume of the auxiliary combustion chamber satisfies the following relationship:

$$0.01 V_N \leq V_z \leq 0.1 V_N,$$

where $V_z$ = the volume of the ignition chamber, and $V_N$ = the volume of the auxiliary combustion chamber.

The fuel quantity/working cycle of the auxiliary combustion chamber satisfies the following relationship with respect to the volume of the auxiliary combustion chamber:

$$0.1 V_N \leq M_K \leq 0.3 V_N,$$

where $M_K$ = the fuel quantity (mm³) of the auxiliary combustion chamber/working cycle, and $V_N$ = a volume of the auxiliary combustion chamber (cm³).

During the operation of the internal combustion engine, a lean fuel mixture is supplied to the main combustion chamber 4 through the mixture suction canal 9 and the inlet valve 2 which forms, with respect to the quantity, the main portion of the charge of the internal combustion engine. On the other hand, a rich fuel mixture is supplied to the auxiliary combustion chamber 5 during the operation of the internal combustion engine through the mixture inlet valve 3. The resulting turbulence within the main combustion chamber and the auxiliary combustion chambger is weakened within the ignition chamber itself so that in it a quiet, less turbulent flow is created, so that optimal conditions are provided for ignition and flame initiation. The good stability of the ignition results from the operating conditions in the ignition chamber and the combustion in the auxiliary combustion chamber. High turbulence and optimum conditions in the auxiliary combustion chamber result in a fast advancing combustion after an extremely short ignition delay. The flame which discharges from the auxiliary combustion chamber ignites the very lean fuel mixture so that the combustion velocity, on the basis of the severe turbulence, is relatively high here. During the intake stroke and the exhaust stroke, in addition, an intensive rest-gas scavenging effect is obtained through openings 12 and 13, by way of which the ignition conditions are improved.

Figure 2:
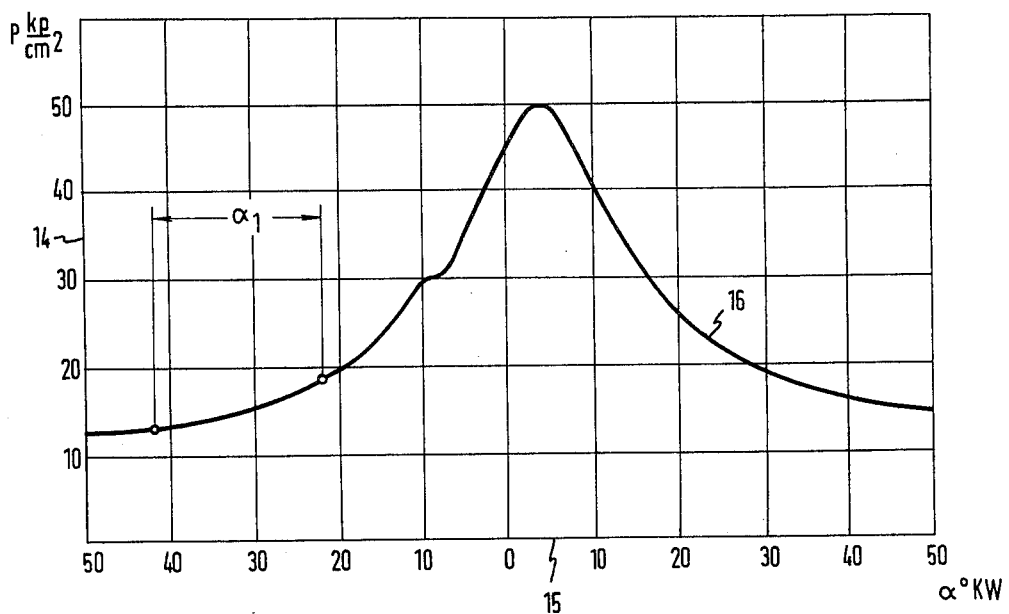
FIG. 2 is a diagram of the pressure characteristic of an Otto-type engine.
Figure 3:
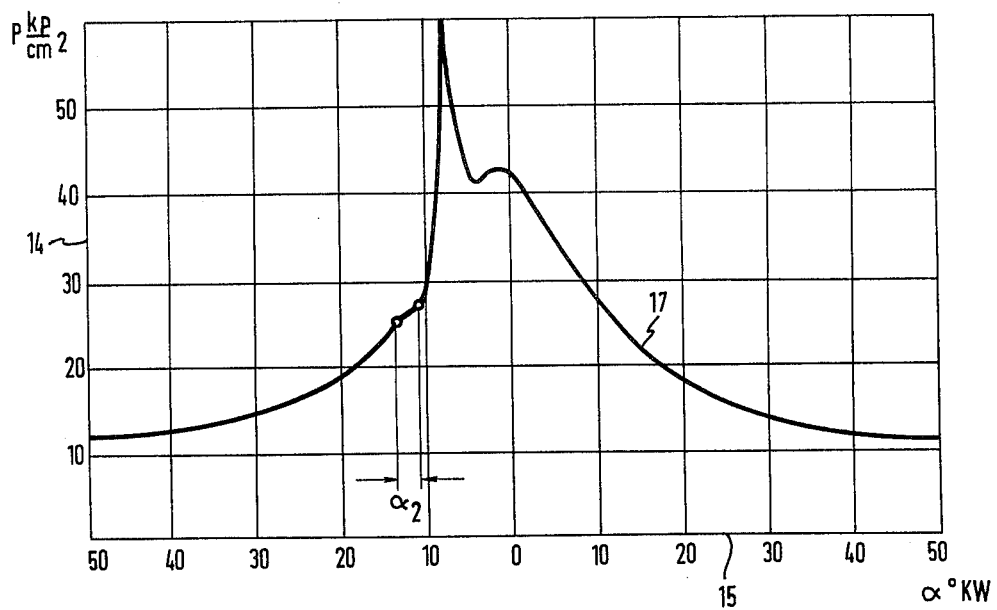
FIG. 3 is a diagram of the pressure characteristic within the auxiliary combustion chamber of the charge stratified engine in accordance with the present invention.
Figure 4:
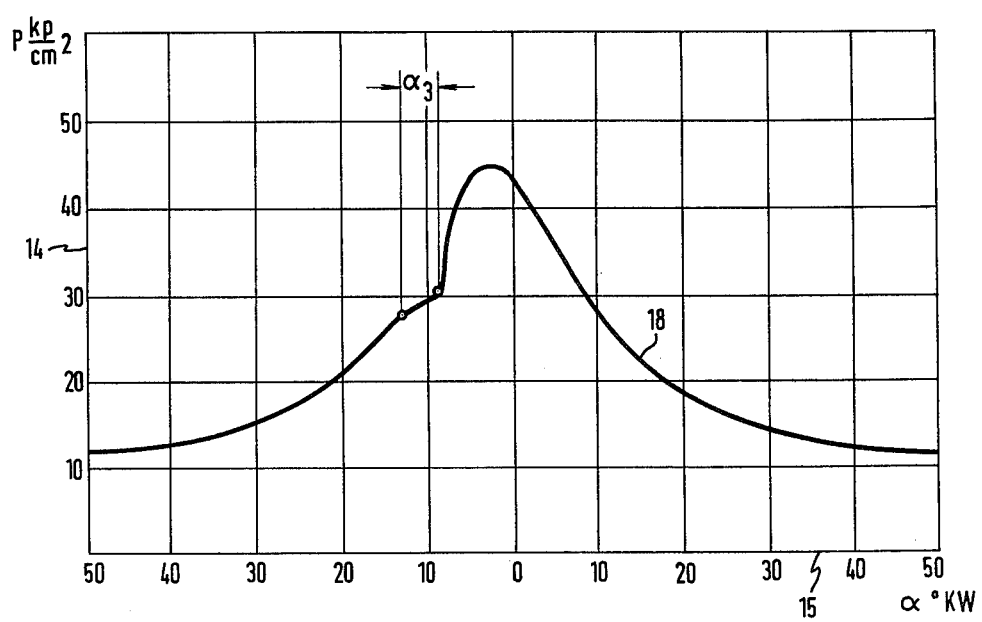
FIG. 4 is a diagram of the pressure characteristic within the main combustion chamber of the charge stratified engine in accordance with the present invention.

In each of FIGS. 2 through 4, the vertical axis represents the pressure P (kg/cm²) and the horizontal axis represents the crank shaft rotation angle α. As can be seen from FIG. 2, the pressure characteristic 16 of a conventional Otto engine has an ignition delay $\alpha_1$ of about 20% of crank shaft rotation.

The pressure characteristic 17, within the auxiliary combustion chamber, of FIG. 3, according to the present invention, has an ignition delay angle $\alpha_2$ close to 5% of crank shaft rotation.

The pressure characteristic 18 within the main combustion chamber of the invention, as shown in FIG. 4, has an ignition delay $\alpha_3$ of about 6% of crank shaft rotation.

As a result, the operating conditions of the present invention, as compared to a conventional Otto engine, are considerably improved.

While I have shown an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A mixture compressing, external auto-ignition, four-stroke cycle internal combustion engine including stratified charging, in which the largest portion of the charge is supplied through at least one inlet valve as a fuel-lean fuel-air mixture to a main combustion space and the remaining portion of the charge being supplied as a fuel-rich fuel-air mixture to an auxiliary combustion chamber through at least one additional mixture inlet, wherein an ignition chamber is associated with the auxiliary combustion chamber and is connected to the auxiliary combustion chamber through at least one opening and in which a spark plug is arranged, characterized in that the volume (Vz) of the ignition chamber is in the following relationship to the volume (Vn) of the auxiliary combustion chamber: $Vz = (0.01$ to $0.1)$ $Vn$.

2. An internal combustion engine according to claim 1, further characterized in that the ignition angle between ignition in the ignition chamber and the start of burning of the fuel-air mixture in the auxiliary combustion chamber is at about 5° to 10° crankshaft rotation.

3. An internal combustion engine according to claim 1, further characterized in that the ignition chamber is connected to the auxiliary combustion chamber through at least two openings having a cross section smaller in comparison to the cross section of the ignition chamber.

4. An internal combustion engine according to claim 3, thereby characterized in that the openings are arranged opposite from each other at the outer circumference of the ignition chamber.

5. An internal combustion engine according to claim 3, further characterized in that one of the openings is arranged at the part of the circumference of the ignition chamber which lies closest to the mixture inlet.

6. An internal combustion engine according to claim 3, characterized in that the openings are positioned one in relation to the other under an angle opening towards the auxiliary combustion chamber.

7. A mixture compressing, external auto-ignition, four-stroke cycle internal combustion engine including stratified charging, in which the largest portion of the charge is supplied through at least one inlet valve as a fuel-lean fuel-air mixture to a main combustion space and the remaining portion of the charge being supplied as a fuel-rich fuel-air mixture to an auxiliary combustion chamber through at least one additional mixture inlet, wherein an ignition chamber is associated with the auxiliary combustion chamber through at least one opening and in which a spark plug is arranged, characterized in that the volume (Vz) of the ignition chamber is in the following relationship to the volume (Vn) of the auxiliary combustion chamber: $Vz = (0.01$ to $0.1)$ $Vn$, and that the fuel quantity (Mk) per working cycle of the auxiliary combustion chamber is in the following relationship to the volume (Vn) of the auxiliary combustion chamber: $Mk = (0.1$ to $0.3)$ $Vn$, whereby Mk = fuel quantity (mm³) of the auxiliary combustion chamber for each working cycle and $Vn$ = volume of the auxiliary combustion chamber (cm³).

8. An internal combustion engine according to claim 7, wherein the at least one opening connecting the auxiliary chamber to the injection chamber is of a cross-section which is reduced in comparison with that of said injection chamber.

9. An internal combustion engine according to claim 7, further characterized in that the ignition angle between ignition in the ignition chamber and the start of burning of the fuel-air mixture in the auxiliary combustion chamber is at about 5° to 10° crankshaft rotation.

10. An internal combustion engine according to claim 7, further characterized in that the ignition chamber is connected to the auxiliary combustion chamber through at least two openings having a cross section smaller in comparison to the cross section of the ignition chamber.

11. An internal combustion engine according to claim 10, thereby characterized in that the openings are arranged opposite from each other at the outer circumference of the ignition chamber.

12. An internal combustion engine according to claim 10, further characterized in that one of the openings is arranged at the part of the circumference of the ignition chamber which lies closest to the mixture inlet.

13. An internal combustion engine according to claim 11, characterized in that the openings are positioned one in relation to the other under an angle opening towards the auxiliary combustion chamber.

* * * * *